MULTIPURPOSE TAPE RECORDER AND PLAYBACK SYSTEM

Filed Feb. 17, 1964 2 Sheets-Sheet 1

INVENTOR.
TEH Y. CHENG

BY
Brickin & Goldfarb
ATTORNEYS

MULTIPURPOSE TAPE RECORDER AND PLAYBACK SYSTEM

Filed Feb. 17, 1964 2 Sheets-Sheet 2

INVENTOR.
TEH Y. CHENG

BY
Brickin & Goldfarb
ATTORNEYS

United States Patent Office 3,295,853

Patented Jan. 3, 1967

3,295,853

MULTIPURPOSE TAPE RECORDER AND PLAYBACK SYSTEM

Teh Yuan Cheng, 148—37 90th Ave., Jamaica, N.Y. 11435

Filed Feb. 17, 1964, Ser. No. 345,430
5 Claims. (Cl. 274—11)

The present invention relates generally to audio devices and more partcularly to multipurpose tape-recording and play-back systems.

As a result of the growing public interest in High Fidelity sound recording, and home audio reproduction, many audiophiles have chosen to record for themselves concerts, shows, operas and the like, either in person, or as these events are transmitted over F.M. radio or F.M. Multiplex radio.

These transmissions and recordings may be either monophonic or stereophonic, and the limitations on the quality of these amateur recordings are caused only by the amateur audiophile's budget.

Among the most serious limitations generally encountered are those which arise when the material being recorded exceeds in length the capacity of the recording equipment for continuous recording on a single spool of tape.

A further difficulty often encountered has been an inability to edit tapes to sort out those portions which are desired from those portions which are unwanted, and then to place the sections in the proper order. Heretofore editing by the amateur consisted of physically cutting apart and splicing together the sections of the tape in the proper order. This type of editing resulted in annoying clicks or lapses in sound at the point of splice, unless the editor is highly skilled and is capable of making a perfect splice.

The preferred method of editing, especially for stereophonic recordings is the spliceless or electronic method which is essentially a re-recording process which, in the past has required the simultaneous use of two independent recorders, one for play-back and one for re-recording.

It is an object of the present invention to provide a tape recorder including means to enable recording for an exceptionally long period of time without any interruption whatsoever in the recording.

Another object of the present invention is to provide a tape recorder having means for electronically editing tapes to place previously recorded selections in proper order without having to cut and splice the tape.

A further object of the present invention is to provide a recorder which will allow the user to have a back-up recorder without having to pay the cost of duplicating the amplifying circuit and the speakers.

A yet further object of the present invention is to provide a recording machine which will facilitate the recording of special sound effects such as a sound-on-sound recording.

A still further object of the present invention is to provide a single recording apparatus which will function as well as two separate and distinct recorders and which will be substantially no larger than the conventional single recorder of the same quality.

Still further objects and features of this invention reside in the provision of a tape recorder, capable of being manufactured by mass production methods and which will be relatively inexpensive to produce and sell, thereby permitting its wide use and distribution.

These, together with the various ancillary objects, features and advantages of the invention will become apparent as the following description proceeds, when taken in conjunction with the accompanying drawings, by way of example only, wherein.

Figures 1, 2, 3, 4:
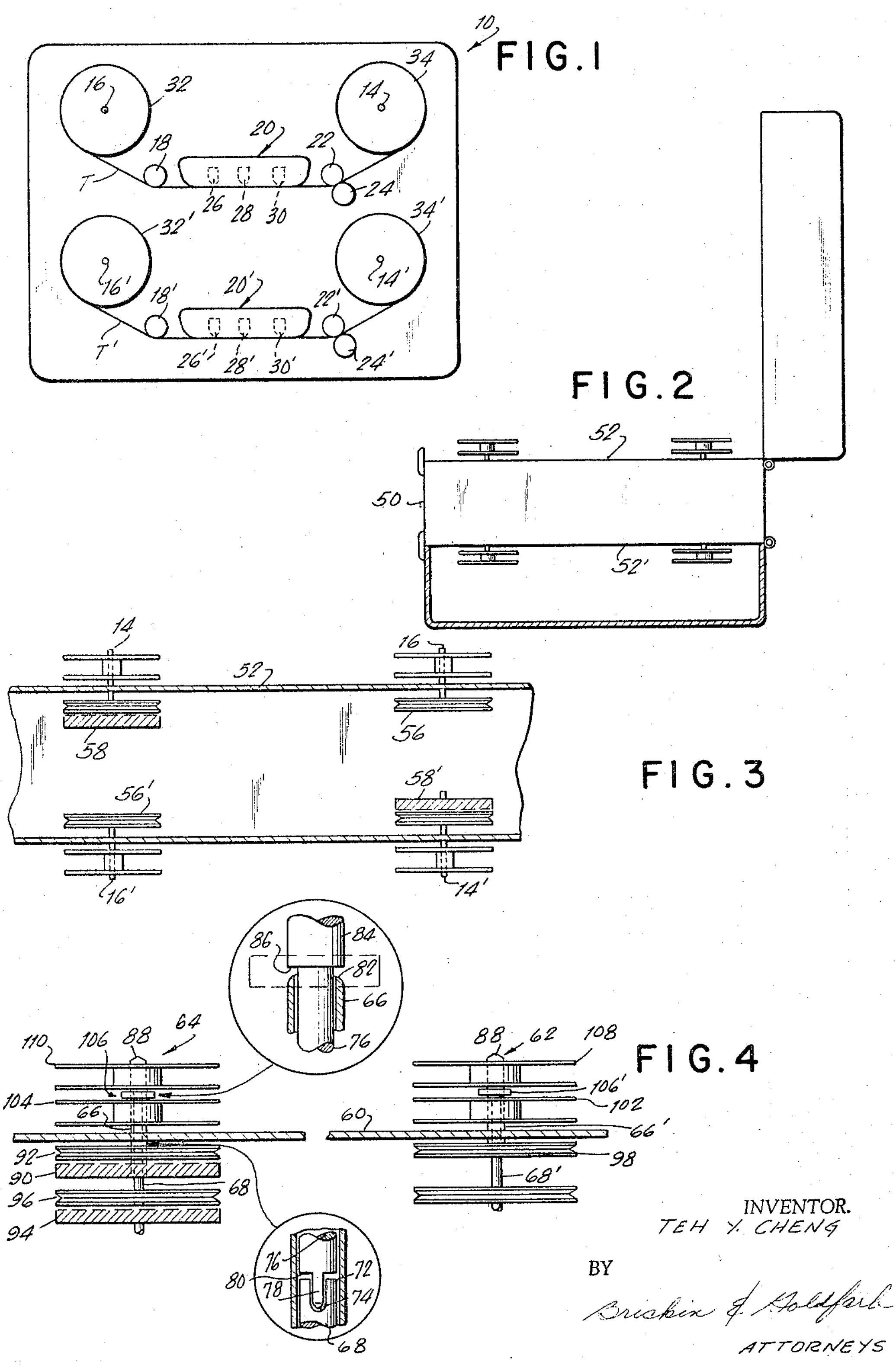
FIG. 1 is a plan view of a front panel of an illustrative multipurpose tape recording and playback system in accordance with the present invention showing the dual tape recording system.
FIG. 2 is a vertical seciontal view of an embodiment of multipurpose tape-recording and playback system mounted within a carrying case.
FIG. 3 is an enlarged vertical sectional view of the multipurpose tape-recording and playback system of FIG. 2 showing the dual tape drive systems mounted in a back-to-back relationship.
FIG. 4 is a view showing another embodiment of the invention including a detachable multipurpose tape-recording and play-back system showing in detail the construction of the spindles which hold the take-up and supply reels.

With continuing reference to the accompanying drawings wherein like reference numerals designate similar parts throughout the various figures, reference numeral 10 generally designates an illustrative embodiment of the multipurpose tape recording and playback system. A panel or tape deck 12 is provided with a pair of take-up reel receiving spindles 14, 14' and a pair of supply reel receiving spindles 16, 16'. A pair of idler wheels 18, 18' are located intermediate the tape head assemblies 20, 20'. Intermediate the tape head assemblies 20, 20' and the take-up reel receiving spindles 16, 16' are capstan rolls 22, 22'. Pinch rolls 24, 24' are arranged in abutting relationship with capstan rolls 22, 22', the assemblies of rolls thus serve as constant speed tape drives. The size of the capstan rolls may be varied in order to allow for different speeds of recording.

Within the tape head assemblies 20, 20' are groups groups of electro-magnetic heads. These groups of electro-magnetic heads are comprised of erasing heads 26, 26', recording heads 28, 28' and playback heads 30, 30'.

Tape supply reels 32, 32' are inserted over the tape supply reel receiving spindles 16, 16'. The tape T, T' is threaded past the idler wheels 18, 18', past the tape heads 26, 28, 30, 26', 28', 30' and between the capstan rolls 22, 22' and the pinch rolls 24, 24'. The take-up reels 34, 34' are placed over the take-up reel securing spindles 14, 14' and the tapes T, T' are then threaded on to the tape take-up reels 34, 34'.

Referring now specifically to FIGS. 2 and 3, the multipurpose tape recorder is shown, with dual tape recording panels 52, 52' being mounted in a carrying case 50. When in this configuration the panels 52, 52' are adapted to be used in vertical back-to-back relation to each other.

Pulley drive wheels 54, 54' are operatively connected to the take-up reel receiving spindles 14, 14' interior of the front panels 52, 52'. Additional pulley drive wheels 56, 56' are connected to the supply reel receiving spindles 16, 16'. The pulley wheels 54, 54', 56, 56' are connected to and are driven by a conventional drive motor (not shown) within the case 50. Friction drive wheels 58, 58' are mounted on the take-up reel receiving spindles 14, 14' respectively in order that constant linear speed and tension will be applied to the tapes T, T' during operation of the tape recorder.

An alternate embodiment of the instant invention is clearly seen with reference to FIG. 4 of the drawings, wherein the supply reel receiving spindle 62 and the take-up reel receiving spindle 64 are located on a single panel 60. The take-up reel receiving spindle 64 and the supply reel receiving spindle 62 are comprised of an outer sleeve 66 and an inner shaft 68.

For the purposes of clarity sections of the spindles 62 and 64 have been broken away and enlarged and appear within the circle as part of FIG. 4. The inner shaft 68 extends midway up within the outer sleeve 66, and terminates in a flat upper surface 72. The upper surface 72 of the shaft 68 has a centrally located recess 74 which recess is preferably of a square side wall configuration. A second extension shaft 76 is provided which has a centrally located square-shaped extension 78 extending downwardly from the lower surface 80 therefrom and which is adapted to be releasably secured within the recess 74 of shaft. When secured in this manner the lower surface 80 of extension shaft 76 abuts the flat upper surface 72 of the inner shaft 68.

The outer sleeve 66 extends above the upper surface of the panel and terminates in a tapered rim 82. The second shaft 76 is provided with an enlarged upper portion 84 which is of the same diameter as is the outer sleeve 66, and is provided with a tapered upper portion 88.

The outer sleeve 66 of the tape-up reel receiving spindle 64 has a friction drive wheel 90 and a pulley wheel 92 connected thereto at the lower end thereof. The inner shaft 68 has a friction drive wheel 94 and a pulley wheel 96 connected thereto at the lower end thereof. The outer sleeve 66 of the supply reel receiving spindle 62 has a pulley wheel 98 connected thereto at the lower end thereof and the inner shaft 68 has a pulley wheel 100 attached thereto.

In order to use this particular embodiment a first pair of tape reels including the supply reel 102 and the take-up reel 104 are placed over the respective outer sleeves 66, 66' of the spindles 64, 62, respectively. Thrust bearings 106, 106' are placed over the respective outer sleeves on the top of the tape reels. After tape reels 102, 104 have been placed over the outer sleeves, extension shafts 76 are inserted into the respective recesses in the spindles 62, 64. The second set of tape reels 108, 110, are then placed on the extension shafts 76.

It is to be understood that a conventional audio amplification circuit means 130 is employed in connection with the tape recording, playback and editor, which amplification means may be located within the casing 50 between the panels 52, 52'.

A switch circuit section 140 is provided comprising switches 142. By means of the switches 142 various modes of operation may be selected and particular functions of the tape recorder placed in operation.

The various operations of the tape recorder are best described by making reference of FIGS. 5 through 9 which schematically show several of the operational facilities attainable.

Figure 5:
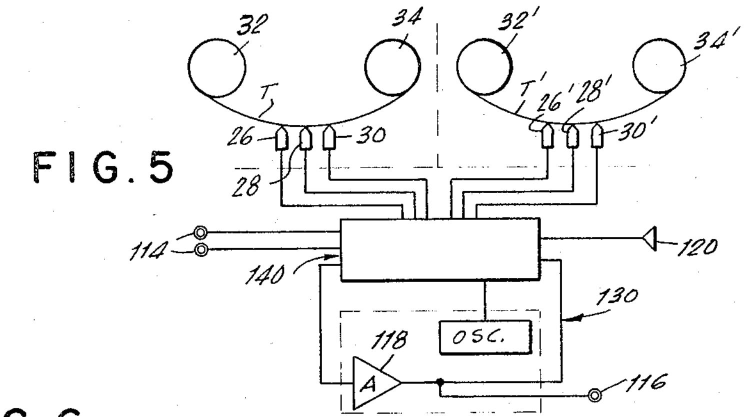
FIG. 5 is a schematic wiring diagram of the multipurpose tape recording and playback system illustrating the dual heads, the dual tape transmission systems, the switching circuits and the audio-amplification circuits.

Referring to FIG. 5, a single audio amplification circuit 118 is connected in parallel to both panels A and B of the tape head and tape transmission sections 26, 28, 30, 26', 28', 30'. Input connections 114, a monitor 116, and speakers 120 are all interconnected so as to work with one or both panels simultaneously.

Figure 6:
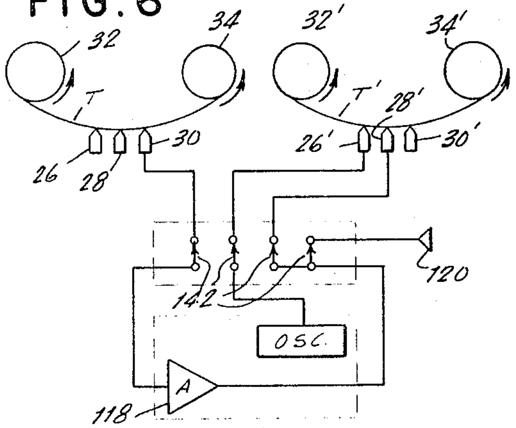
FIG. 6 is a wiring diagram of the multipurpose tape recording and playback system showing the recorder, the switching circuit being connected for the purpose of editing and duplicating.

In FIG. 6, panel A is being used as a playback assembly while panel B is being used to edit or duplicate. Head 30 of panel A is serving to play back the previously recorded tape while simultaneously panel B is being used to re-record the desired portions of the tape being played on panel A. By means of the speaker 120 or the monitor 116 the operator is able to determine which portions of the tape being played on panel A he is desirous of re-recording on panel B. By means of the switches in the switch circuit section, either panel may be started or stopper independently of the other. In the event that the operator desires to remove a section from the tape being played on panel A, he merely stops the operation of both panels. Panel B is then reversed and will be brought back until it is at the point where it is desired that the recording start. Panel A then continued running until the undesired portion of the tape is passed. At this time the re-recording will be continued by using both panels of the recording machine as above described. This process may be repeated as often as necessary until only the desired portions have been re-recorded on the tape of panel B.

Figure 7:
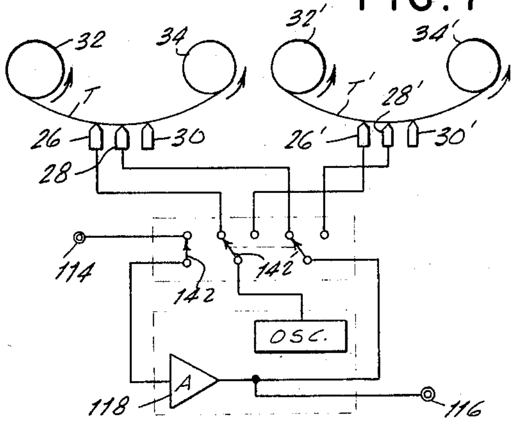
FIG. 7 is a wiring diagram of the multipurpose tape recording and playback system showing the recorder, the switching circuit being connected for the purpose of uninterrupted recording.

Referring now to FIG. 7, the recording apparatus is arranged for uninterrupted recording.

In this mode when the tape on panel A is about to run out, panel B is started by activating the proper switches so that there will be a switching over of recording from one panel to the other. Panel A is stopped and the uninterrupted recording will continue on panel B. This process may be repeated as often as necessary by switching from panel to panel as long as an uninterrupted recording is necessary.

Figure 8:
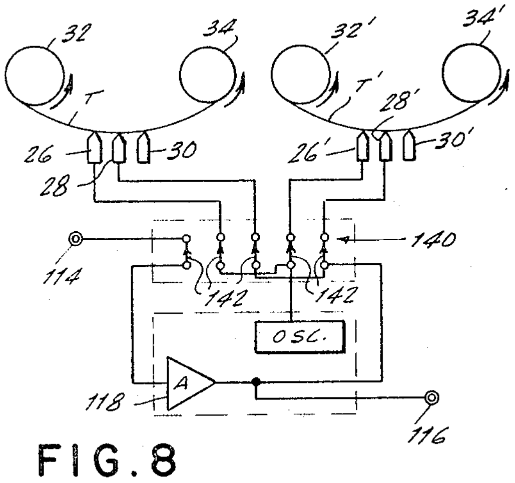
FIG. 8 is a wiring diagram of the multipurpose tape recording and playback system showing the recorder, the switching circuit being connected for the purpose of simultaneous recording; and, FIG. 9 is a wiring diagram of the multpiurpose tape recording and playback system showing the recorder, the switching circuit being connected for the purpose of uninterrupted playback.

FIG. 8 shows schematically the operation of the recorder where it is desired to make simultaneous recordings on both panels. When used in this mode it is possible to record simultaneously the same material on both panels using the single amplifier section by varying the positions of the switches on the switching complex generally indicated at 140 and the connections mode to the input area 114. In this mode of operation one panel may be recording at one speed and the other panel recording at a different speed, as may be desirable for special effects.

It is to be recognized that the present invention may be adapted for employment with sound or video tapes.

Figure 9:
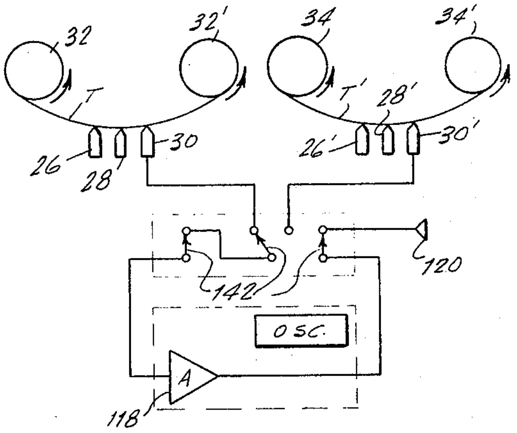

By means of the switch circuit section, the recorder may be set for continuous playback without interruption as is shown in FIG. 9. When used in this manner, the switch-over from one panel to the other may be either manual or automatic by means of relays activated by mechanical or electronic signals placed on the tape such as an ultrasonic tone near the end of the tape.

The possible combinations and uses to which the recorder may be put are substantially unlimited.

A latitude of modification, chance and substitution is intended in the foregoing disclosure and in some instances some features of the invention will be employed without a corresponding use of other features. Accordingly, it is appropriate that the appended claims be construed broadly and in a manner consistent with the spirit and scope of the invention herein:

I claim:

1. A tape recording, playback and editing machine comprising a pair of sound reproducing and recording assemblies, independent drive means connected to said assemblies for operating said assemblies, each of said assemblies including a supply reel, a take-up reel and magnetic heads, an audio amplification circuit means, switching means selectively operatively connecting the magnetic of said assemblies to said audio amplification circuit means so that said assemblies can be selectively operated simultaneously and independently of each other, said supply reels being coaxial, said take-up reels being coaxial, said supply reels and said take-up reels being controlled by said independent drive means one of said magnetic heads being superposed on the other magnetic heads.

2. A tape recording, playback and editing machine comprising a pair of sound reproducing and recording assemblies, said assemblies being mounted on separate panels, independent drive means connected to said assemblies for operating said assemblies, each of said assemblies including a supply reel, a take-up reel and magnetic heads, an audio amplification circuit means interconnected to each of said sound reproducing and recording assemblies, switching means selectively operatively connecting the magnetic heads of said assemblies to said audio amplification circuit means, and said drive means so that said assemblies and said drive means can be selectively operated simultaneously and independently of each other.

3. A tape recording, playback and editing machine comprising a pair of sound reproducing and recording assemblies, each of said recording assemblies being mounted on a separate panel, independent drive means connected to said assemblies for operating said assemblies, each of said assemblies including a supply reel, a take-up reel and magnetic heads, an audio amplification circuit means, switching means selectively operatively connecting the magnetic heads of said assemblies to said audio amplification circuit means so that said assemblies can be selectively operated simultaneously and independently of each other, and mode control means selectively operatively connected to said drive means controlling the mechanical functions of said drive means.

4. A tape recording, playback and editing machine comprising a mounting panel a pair of sound reproducing and recording assemblies, separate drive means connected to said assemblies for operating said assemblies, each of said assemblies including a supply reel, a take-up reel and magnetic heads, an audio amplification circuit means, switching means selectively operatively connecting the magnetic heads of said assemblies to said audio amplification circuit means so that said assemblies can be selectively operated simultaneously and independently of each other, pairs of coaxial shafts journalled in said panel, and operatively connected to said separate drive means, said take-up reels being mounted on one pair of said coaxial shafts, and said supply reels being mounted on another pair of said coaxial shafts, and means for separately controlling said drive means for selectively separately and simultaneously driving said shafts.

5. A tape recording, playback and editing machine comprising a housing, a pair of sound reproducing and recording assemblies, separate drive means releasably connected to each of said assemblies for operating said assemblies, each of said assemblies including a supply reel, a take-up reel and magnetic heads, an audio amplification circuit means, switching means selectively operatively connecting the magnetic heads of said assemblies to said audio amplification circuit means so that each of said assemblies can be selectively operated simultaneously and independently of each other, one of said pair of assemblies being disposed in said housing, and means detachably securing the other of said pair of assemblies to said housing and for connection to said audio amplification circuit means by said switching means.

References Cited by the Examiner

German application, No. 1,041,269, October 1958.

NORTON ANSHER, *Primary Examiner.*

CLIFFORD B. PRICE, *Examiner.*